(12) United States Patent
Mane et al.

(10) Patent No.: US 11,416,908 B2
(45) Date of Patent: Aug. 16, 2022

(54) COMPLEMENTARY-SIMILARITY LEARNING USING A QUADRUPLET NETWORK

(71) Applicant: Walmart Apollo, LLC, Bentonville, AR (US)

(72) Inventors: Mansi Ranjit Mane, Sunnyvale, CA (US); Stephen Dean Guo, Saratoga, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 354 days.

(21) Appl. No.: 16/779,133

(22) Filed: Jan. 31, 2020

(65) Prior Publication Data

US 2021/0056609 A1 Feb. 25, 2021

Related U.S. Application Data

(60) Provisional application No. 62/891,145, filed on Aug. 23, 2019.

(51) Int. Cl.
*G06Q 30/00* (2012.01)
*G06Q 30/06* (2012.01)
*G06N 3/04* (2006.01)
*G06F 40/20* (2020.01)
*G06N 20/00* (2019.01)

(52) U.S. Cl.
CPC ......... *G06Q 30/0629* (2013.01); *G06F 40/20* (2020.01); *G06N 3/0481* (2013.01); *G06N 20/00* (2019.01); *G06Q 30/0603* (2013.01)

(58) Field of Classification Search
None
See application file for complete search history.

(56) References Cited

U.S. PATENT DOCUMENTS

| | | | |
|---|---|---|---|
| 8,290,818 B1 | 10/2012 | Levitan et al. | |
| 10,109,051 B1 | 10/2018 | Natesh et al. | |
| 2019/0114515 A1 | 4/2019 | Bhardwaj et al. | |
| 2021/0049664 A1* | 2/2021 | Lundgaard | G06Q 30/0627 |

* cited by examiner

*Primary Examiner* — Mila Airapetian
(74) *Attorney, Agent, or Firm* — Bryan Cave Leighton Paisner LLP

(57) ABSTRACT

A system including one or more processors and one or more non-transitory computer-readable media storing computing instructions configured to run on the one or more processors and perform generating a training dataset comprising training quadruplets; generating a respective text feature vector for each of the four respective items for the each of the training quadruplets using a vector encoder; transforming the respective text feature vector for each of the four respective items; training the shared trainable parameters of the feature representation transformation model; receiving, from a user device a selection of an anchor item from the item catalog; determining, for the anchor item, one or more similar items or one or more complementary items; and sending instructions to display the one or more of the one or more similar items or the one or more of the one or more complementary items on the user device. Other embodiments are disclosed.

20 Claims, 8 Drawing Sheets

COMPLEMENTARY-SIMILARITY LEARNING USING A QUADRUPLET NETWORK

CROSS-REFERENCE TO RELATED APPLICATION

This application is a continuation of U.S. Patent Provisional Application No. 62/891,145, filed Aug. 23, 2019, which is incorporated herein by reference in its entirety.

TECHNICAL FIELD

This disclosure relates generally relates to a complementary-similarity learning using a quadruplet network.

BACKGROUND

Many users order items through an online website on a frequent basis. Frequently, complementary items and/or similar items are offered along with the item selected by a user. Identifying whether pairs of items are complementary and/or similar to each other can offer a user many more options otherwise not discovered during a visit to a website. Such identification can be time-consuming.

BRIEF DESCRIPTION OF THE DRAWINGS

To facilitate further description of the embodiments, the following drawings are provided in which.

Figure 1:
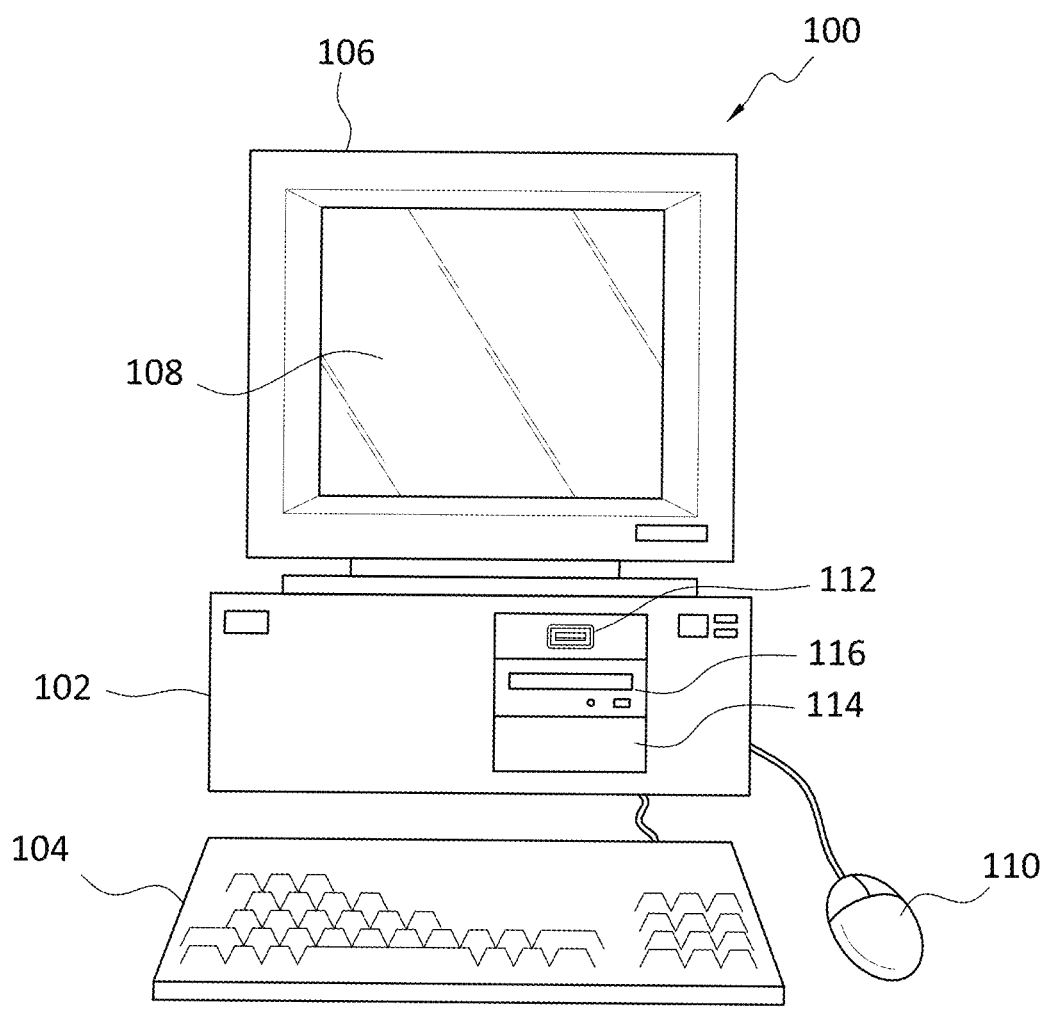
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

In many embodiments, a quadruplet network can be capable of differentiating between similar, complementary, and negative items. In several embodiments, quadruplets can be used to determine product recommendations for an item selected by a user visiting an online website. In some embodiments, automatically offering the complementary and/or similar item in response to a user selecting an item can be based on using the quadruplet network for the items.

Figure 2:
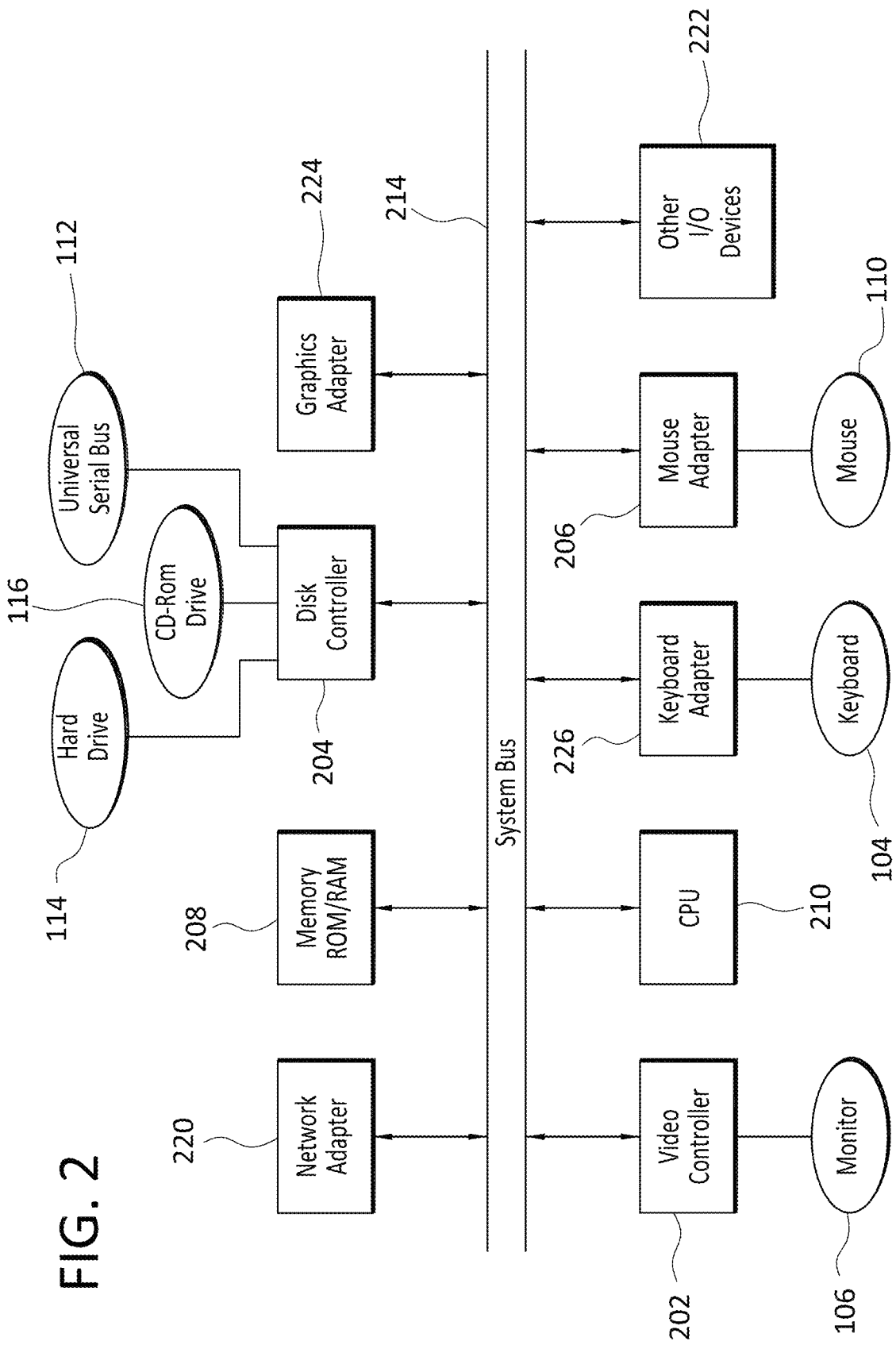
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
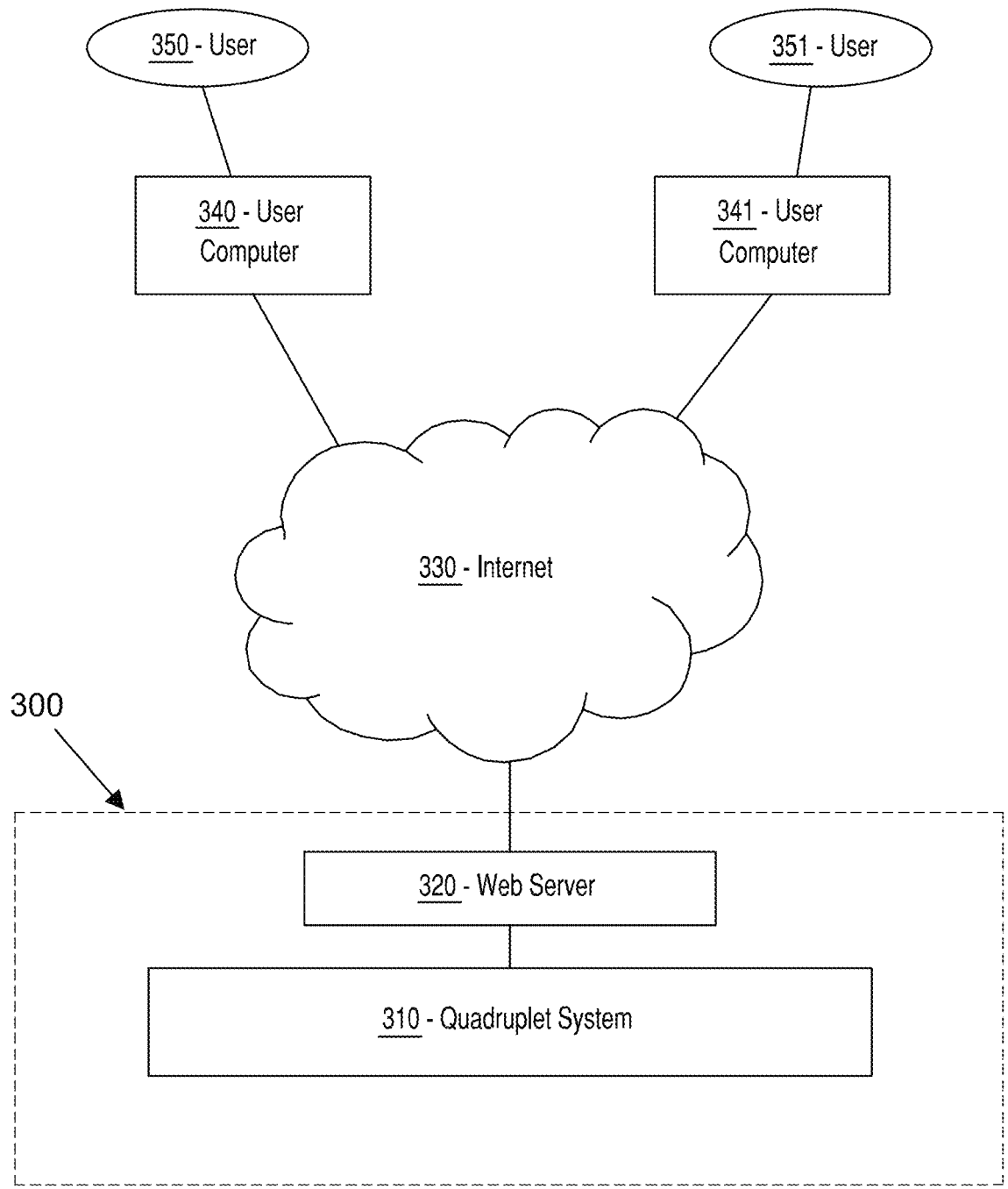
FIG. 3 illustrates a block diagram of a system that can be employed for complementary-similarity learning using a quadruplet network, according to an embodiment.

Turning ahead in the drawings, FIG. 3 illustrates a block diagram of a system 300 that can be employed for complementary-similarity learning using a quadruplet network, according to an embodiment. In many embodiments, using complementary-similarity learning can include generating quadruplets, which in some embodiments can be used to generate recommendations for similar and/or complementary items for an anchor item selected by a user while ordering an item from an online website. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a quadruplet system 310 and/or a web server 320. Quadruplet system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, quadruplet system 310 and/or web server 320. Additional details regarding quadruplet system 310 and/or web server 320 are described herein.

In a number of embodiments, each of quadruplet system 310 and/or web server 320 can be a special-purpose computer programed specifically to perform specific functions not associated with a general-purpose computer, as described in greater detail below.

In some embodiments, web server 320 can be in data communication through Internet 330 with one or more user computers, such as user computers 340 and/or 341. Internet 330 can be a public or private network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In some embodiments, an internal network that is not open to the public can be used for communications between quadruplet system 310 and/or web server 320 within system 300. Accordingly, in some embodiments, quadruplet system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, quadruplet system 310 and/or web server 320 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to quadruplet system 310 and/or web server 320, in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of quadruplet system 310 and/or web server 320. In a similar manner, the processors and/or the non-transitory computer-readable media can be local and/or remote to each other.

Meanwhile, in many embodiments, quadruplet system 310 and/or web server 320 also can be configured to communicate with and/or include one or more databases and/or other suitable databases. The one or more databases can include an item database that contains information about items or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between quadruplet system 310 and/or web server 320, and/or the one or more databases, can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, quadruplet system 310 can be a general-purpose computer or a special-purpose computer programmed to perform specific functions and/or applications. For example, quadruplet system 310 can perform training a quadruplet network by transforming text feature vectors for items into training quadruplets using a feature representation transformation model.

Figure 4:
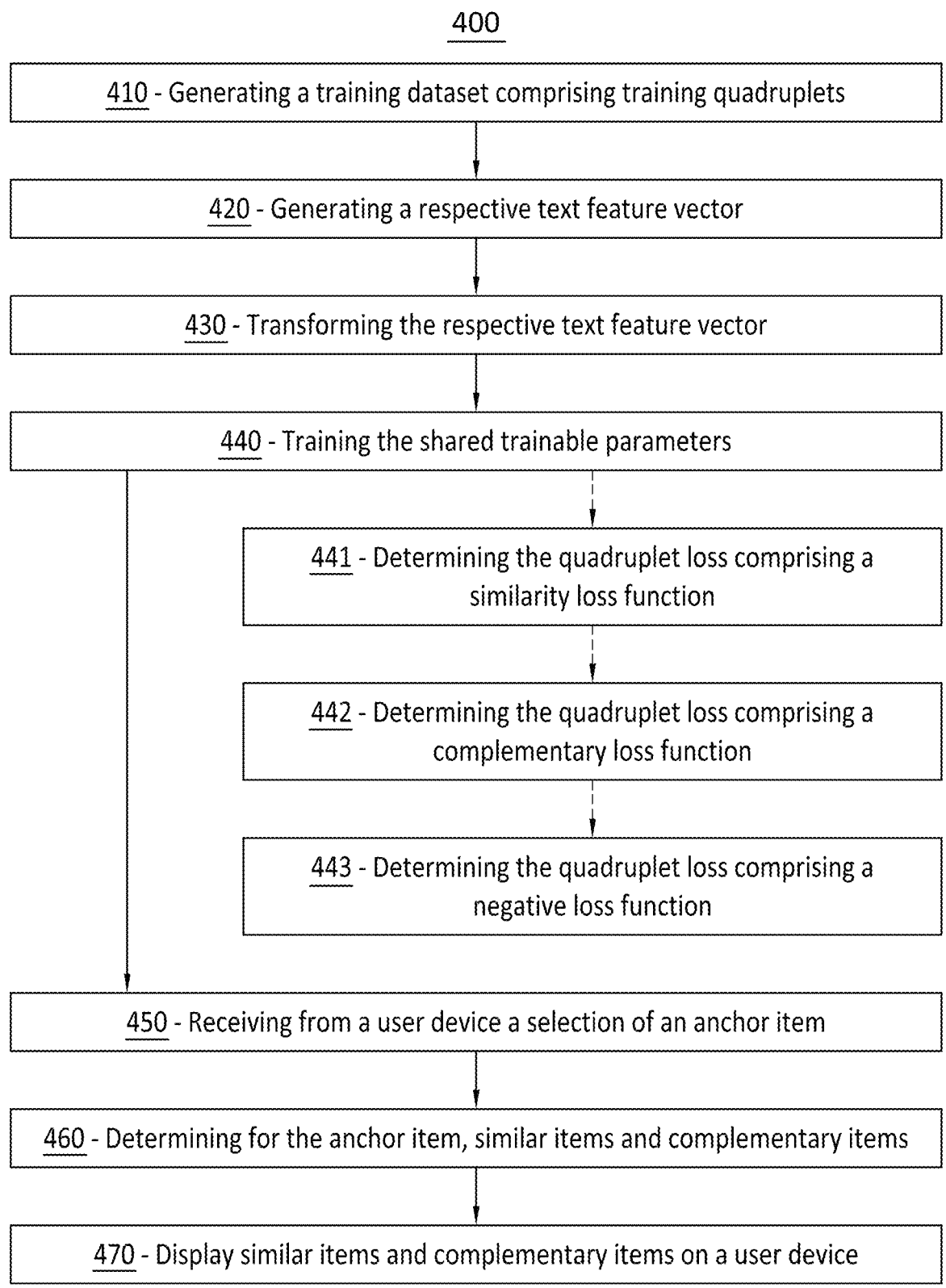
FIG. 4 illustrates a flow chart for a method, according to another embodiment.

Turning ahead in the drawings, FIG. 4 illustrates a flow chart for a method 400, according to another embodiment. In some embodiments, method 400 can be a method of training a quadruplet network and using the quadruplet network to differentiate between similar, complementary, and negative items in a quadruplet of items in an online catalog. In many embodiments, the quadruplet network can be used to automatically present recommended items that are complementary and/or similar to an anchor item selected on a user interface of a user computer (e.g., 340-341 (FIG. 3) of a user (e.g., 350-351 (FIG. 3)). In several embodiments, the recommend items can be generated by training shared trainable parameters using a feature representation transformation model. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as quadruplet system 310 and/or web server 320. The processor(s) can be similar or identical to the processor(s) described above with respect to computer system 100 (FIG. 1).

Referring to FIG. 4, method 400 can include a block 410 of generating a training dataset comprising training quadruplets. In some embodiments, each of the training quadruplets comprises four respective items of an item catalog. In a number of embodiments, the four respective items of an item catalog can include a respective anchor item, a respective similar item, a respective complementary item, and a respective negative item.

In many embodiments, the training dataset can be used for similar, complementary, and/or negative items that can be derived from an existing co-purchase dataset, such as the a Clothing, Shoes, and Jewelry dataset, which can include known sets of anchor, complementary, and negative items.

For example, an approach for a complementary-similarity learning framework can focus on clothing and fashion verticals. In many embodiments, learning similar and complementary relationships simultaneously can be learned through textual title data (e.g., metadata). In some embodiments, the complementary-similarity learning framework can be applied across a broad set of items in an online catalog (e.g., an item catalog) and can generate complementary item recommendations at scale.

Figure 7:
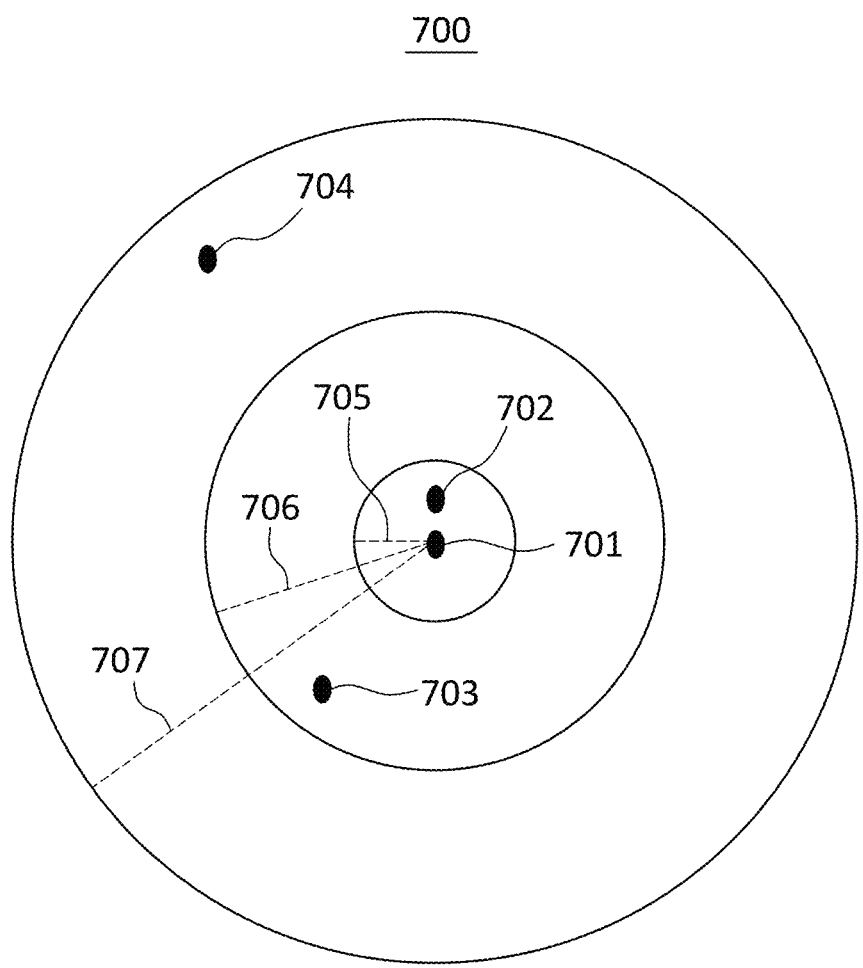
FIG. 7 illustrates an exemplary graph of a representation space, according to another embodiment.

In some embodiments, the complementary-similarity learning framework using a quadruplet network can include learning what other items can go with another item ordered by a user, such as a T-shirt. In several embodiments, such a complementary-similarity learning framework can learn distributed representations for items from textual data. In many embodiments, the learned distributed representations can include representing items in a latent space that can include expressing functional complementarity as well similarity. In various embodiments, using the complementary-similarity learning framework can include placing functionally similar items close together in the latent space, while placing complementary items closer than non-complementary items, but farther away than similar items, as shown in FIG. 7 and described below.

In several embodiments, method 400 also can include a block 420 of generating a respective text feature vector for each of the four respective items for the each of the training quadruplets. In many embodiments, training quadruplets can include using a vector encoder with shared non-trainable parameters across the four respective items. In many embodiments, a dimension of the respective text feature vector generated by the vector encoder can be 512 and the vector encoder can be a Google Universal Sentence Encoder ("GUSE"). In many embodiments, using Universal Sentence Encoder can generate 512 dimensional embeddings using the item title information.

In various embodiments, capturing complementary items can include utilizing text in item title information rather than images. In some embodiments, for example, text feature vectors, such as $a_t$, $c_t$, $s_t$, $n_t$, can be generated from title information using the a universal sentence encoder (e.g., GUSE). In many embodiments, example text feature vectors $a_t$, $c_t$, $s_t$, $n_t$ can be generated from text features (e.g., item title) for an anchor item a, a complementary item c, a similar item s, and a negative item n, respectively, as shown in Table 1 and described below.

In many embodiments, generating text feature vectors for each of the four respective items for the each of the training quadruplets can include training a transformer-based encoder on multiple tasks, such as semantic text classification, fine grained question classification, sentiment analysis, and/or other suitable transformer based encoder approaches. In various embodiments, determining similarity and complementary relationships for items can include using predetermined thresholds for distances between the complementary item and the similar item.

In various embodiments, method 400 can include a block 430 of transforming the respective text feature vector for each of the four respective items for the each of the training quadruplets into a respective transformed representation using a feature representation transformation model having shared trainable parameters across the four respective items. In many embodiments, the text feature vectors $a_t$, $c_t$, $s_t$, $n_t$ can be transformed into transformed representations $a_f$, $c_f$, $s_f$, $n_f$, respectively.

In many embodiments, item recommendations for a complementary item and/or a similar item can be diverse.

For example, if a customer is shopping for a top, reminding customers about a set of jeans, belt, and scarf can be more useful to the user than just recommending a set of complementary jeans. Various embodiments can learn latent representations, where for a given anchor item, similar items can be clustered together. In several embodiments, complementary items can be clustered together, but can be placed farther apart in a latent space than similar items, while non-complementary and non-similar items (e.g., negative items) can be placed further apart on the latent space.

In a number of embodiments, transforming the respective text feature vector using a feature representation transformation model can include using a neural network comprising a first fully connected layer with a Rectified Linear Unit (ReLU) and a second fully connected layer. In various embodiments, item title information can be used to generate initial representations.

In several embodiments, a mapping function $f$ can be learned to project the text feature vectors into learning representations, which can model complementariness and similarity between items in a catalog. In various embodiments, text feature vectors projected into the learning representations in a latent space can include differentiating between similar items, complementary items, and negative items, as shown in FIG. 7 and described below. In various embodiments, the mapping function can use two fully connected layers with ReLU (a rectified linear unit) activation. In many embodiments, the first layer can have 256 hidden units and the second layer can have 128 hidden units.

In many embodiments, the neural network can include a dimension of a vector embedding output of the first fully connected layer with the ReLU is 256. In some embodiments, the neural network can include a dimension of the respective transformed representation for each of the four respective items for the each of the training quadruplets generated by the second fully connected layer is 128.

In several embodiments, method 400 can include a block 440 of training the shared trainable parameters of the feature representation transformation model, for the each of the training quadruplets, using a quadruplet loss for the four respective items of the each of the training quadruplets, to differentiate between the respective transformed representations of the four respective items.

In many embodiments, negative margin ($m_n$) on the latent space can define how far away negative items can be from anchor items using a predetermined threshold. This margin ($m_n$) along with ($m_s$) and ($m_c$) can be found using different hyper-parameter tuning techniques such as grid search, random search, Bayesian optimization etc. For example if the anchor item is blue jeans and negative item is wedding gown, the distance should be high. Also, if the anchor item is blue jeans and the complementary item is belt, the distance in embedding space (e.g., latent space) cannot be zero, as this can hinder the ability of the complementary-similarity learning framework using the quadruplet network to differentiate between the current anchor jeans and other jeans.

In various embodiments, method 400 can include a block 440 of training the shared trainable parameters of the feature representation transformation model, for the each of the training quadruplets, using a quadruplet loss for the four respective items of the each of the training quadruplets, to differentiate between the respective transformed representations of the four respective items can include determining the quadruplet loss, for each of the training quadruplets, based on a quadruplet loss function. In some embodiments, the quadruplet loss function can include a similarity loss function, a complementary loss function, and/or a negative loss function.

In many embodiments, method 400 can include a block 441 of generating the similarity loss function using a similarity margin. In several embodiments, using the quadruplet loss can include mapping distances, such as where an item anchor a and corresponding mapping $a_f$ (e.g., anchor feature representation), can include a distance for a similar item $s_f$ (e.g., a feature representation for a similar item) not farther than a predetermined distance, called the margin $m_s$ (e.g., similarity margin, wherein m represents margin, and s represents similarity) in the mapped space. In many embodiments, this goal can be achieved by minimizing distance between the anchor item and similar item. In many embodiments, this process can involve first normalizing the embeddings $a_f$, $c_f$, $s_f$ and $n_f$ that can be unit norm, denoted by $a_f'$, $c_f'$, $s_f'$, $n_f'$ and then calculate Euclidean distances between those embeddings. In some embodiments, a similarity based loss (e.g., similar item loss) can be determined using equation 1:

$$L_{sim}=\max(a_f'-s_f')-m_s,0) \qquad (1)$$

In several embodiments, method 400 can include a block 442 of generating the complementary loss function using the similarity margin and a complementary margin. In various embodiments, a Euclidean distance between normalized learned feature vectors can be denoted by $d(a_f, s_f)$, where d represents a Euclidean distance, $a_f$ represents an anchor feature representation, and $s_f$ represents an similar item feature representation. In some embodiments, complementary items can be mapping $c_f$ closer to anchor item $a_f$, but farther than similar item $s_f$, can indicate the loss between anchor and complementary items, where $c_f$ represents a complementary item feature representation. In many embodiments, a complementary based loss (e.g., a complementary item loss) can be determined using equation 2:

$$L_{comp}=\max(d(a_f'-c_f')-m_c,0)+\max(m_s-d(a_f'-c_f'),0) \qquad (2)$$

In several embodiments, a first term in a complementary loss can be positive when the complementary item can be away from the anchor item by more than margin $m_c$ distance, thus the distance between anchor item and complementary item can be smaller than $m_c$, where $m_c$ represents a complementary margin. In many embodiments, a second term in the complementary can be positive when the distance between the anchor item and the complementary item can be less than margin $m_s$, to prevent complementary items that can project onto similar items.

In various embodiments, method 400 can include a block 443 of generating the negative item loss function using a negative margin. In various embodiments, negative items can be farther away on the latent space from the anchor item than similar items and complementary items. In many embodiments, penalizing the model if negative items can be farther than a predetermined distance, (e.g., margin $m_n$), can otherwise hamper learning of similar and complementary items, where $m_n$ represents a negative margin. In some embodiments, the loss for negative items can be based on equation 3:

$$L_{neg}=\max(m_n d(a_f'-n_f'),0) \qquad (3)$$

In some embodiments, hyperparameter $\lambda$ can include a regularization rate added to the quadruplet loss. In several embodiments, hyperparameters can have a mapping function with the results of a fully connected layer 2 ($FC_2$) fed back into the quadruplet loss. Such a mapping function can be performed as follows:

$$\text{Text} \rightarrow \text{GUSE}^{512} \rightarrow (FC_1 + \text{ReLU})^{256} \rightarrow FC_2^{128} \rightarrow L_{quad}$$

In several embodiments, mapping hyperparameters to be fed back to the quadruplet loss can begin by including a transformation of text into a vector representation by using an encoder, such as GUSE. In many embodiments, using the neural network, the vector representation can be a first fully connect layer ($FC_1$) with a ReLU and processed into a second fully connected layer ($FC_2$) eventually fed (e.g., added back) into a quadruplet loss ($L_{quad}$). In some embodiments, hyperparmeters can include an input feature dimension of 512, epochs of 50, weight initialization: such as Xavier, a learning rate of 0.001, $m_s$ of 0.1, $m_c$ of 0.4, and $m_n$ of 0.8, and where the $FC_1$ can have 256 hidden units and the $FC_2$ can have 128 hidden units.

In many embodiments, one of the constraints in the quadruplet loss function can be $m_s < m_c < m_n$.

In several embodiments, the loss for the $l_2$ regularization can be determined using equation 4:

$$L_{l2} = \Sigma_i W_{1i}^2 + \Sigma_i W_{2i}^2 \qquad (4)$$

In many embodiments, a final quadruplet loss, $L_{quad}$, can be determined using equation 5:

$$L_{quad} = L_{sim} + L_{comp} + L_{neg} + \lambda L_{l2} \qquad (5)$$

where $L_{l2}$ can be used as a loss equalizer.

In various embodiments, differentiating between complementary items and similar items can be learned from the complementary-similarity learning framework learning from functional complementary relationships and from learning similarity. For example, a model that can be unable to differentiate between the two relationships can lead to spurious similar recommendations that can be displayed as a complementary item rather than a similar item. In another example, given shoes as an anchor item, recommendations of different types of other shoes as complementary items rather than similar items can be not ideal from a user experience perspective. With the increasing number of items and categories available online (more than 600 million), it can be difficult to manually label each and every item with fine-grained category information. Additionally, a manual process can be a time-consuming and dependent on manual processes labeling from domain experts, along with crowd-sourcing budget and support. The training techniques described herein can beneficially automatically label items.

In various embodiments, method 400 can include a block 450 of receiving, from a user device, a selection of an anchor item from the item catalog. The user device can be similar or identical to user computers 340-341 (FIG. 3). For example, a user (e.g., user 350-351 (FIG. 3)) can select an item on a website to view the item. This item can be considered the anchor item.

In various embodiments, method 400 can include a block 460 of determining, for the anchor item, one or more of (a) one or more similar items from the item catalog or (b) one or more complementary items from the item catalog using the feature representation transformation model, as trained. In various embodiments, the one or more similar items to the anchor item can be determined based on respective second transformed representations generated using the feature representation model, as trained, for each of the one or more similar items in the item catalog within a similarity margin. In various embodiments, the one or more complementary items to the anchor item can be determined based on respective second transformed representations generated using the feature representation model, as trained, for each of the one or more complementary items in the item catalog being outside a similarity margin and inside a complementary margin.

In various embodiments, method 400 can include a block 470 of sending instructions to display on the user device the one or more of (a) the one or more similar items or (b) the one or more complementary items.

Figure 5:
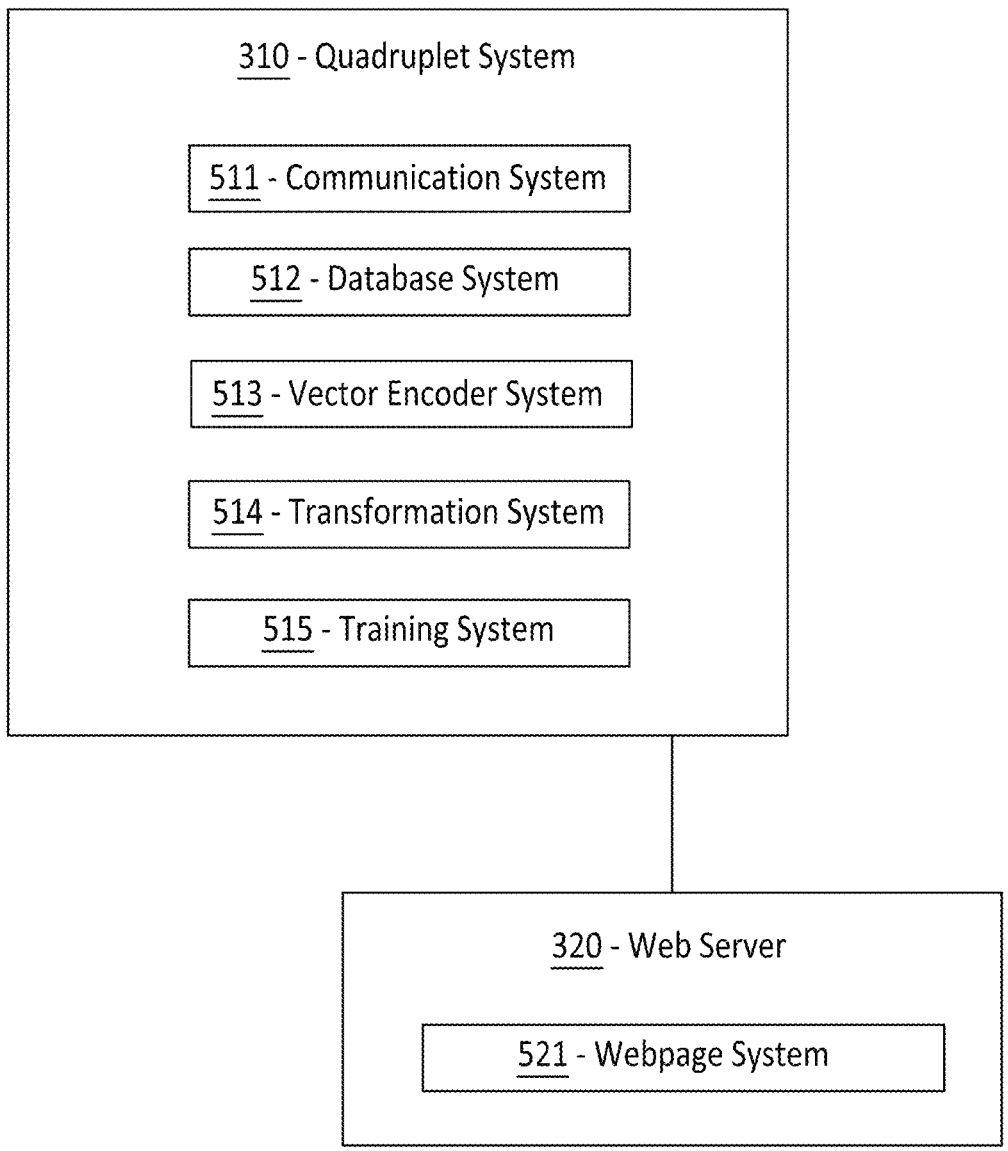
FIG. 5 illustrates a representative block diagram of the system of FIG. 3.

Turning to the next drawing, FIG. 5 illustrates a block diagram of system 300, according to the embodiment shown in FIG. 3. Quadruplet system 310 and/or web server 320 are merely exemplary and are not limited to the embodiments presented herein. Quadruplet system 310 and/or web server 320 can be employed in many different embodiments or examples not specifically depicted or described herein. In some embodiments, certain elements or systems of quadruplet system 310 and/or web server 320 can perform various procedures, processes, and/or acts. In other embodiments, the procedures, processes, and/or acts can be performed by other suitable elements or systems. In many embodiments, the systems of quadruplet system 310 and/or web server 320 can be modules of computing instructions (e.g., software modules) stored at non-transitory computer readable media. In other embodiments, the systems of quadruplet system 310 and/or web server 320 can be implemented in hardware.

In many embodiments, quadruplet system 310 can include a communication system 511. In a number of embodiments, communication system 511 can at least partially perform block 450 (FIG. 4) of receiving, from a user device, a selection of an anchor item from the item catalog, and/or block 470 (FIG. 4) of sending instructions to display on the user device the one or more of (a) the one or more similar items or (b) the one or more complementary items.

In several embodiments, quadruplet system 310 also can include a database system 512. In various embodiments, database system 512 can at least partially perform block 410 (FIG. 4) of generating a training dataset comprising training quadruplets, and/or block 460 (FIG. 4) of determining, for the anchor item, one or more of (a) one or more similar items from the item catalog or (b) one or more complementary items from the item catalog, using the feature representation transformation model, as trained.

In some embodiments, quadruplet system 310 also can include a vector encoder system 513. In many embodiments, vector encoder system 513 can at least partially perform block 420 (FIG. 4) of generating a respective text feature vector for each of the four respective items for the each of the training quadruplets, block 601 (FIG. 6, described below) of generating a feature representation of an anchor item, $a_f$, block 602 (FIG. 6, described below) of generating a feature representation of a complementary item, $c_f$, block 603 (FIG. 6, described below) of generating a feature representation of a similar item, $s_f$, and/or block 604 (FIG. 6, described below) of generating a feature representation of a negative item, $n_f$.

In some embodiments, quadruplet system 310 also can include a transformation system 514. In many embodiments, transformation system 514 can at least partially perform block 430 (FIG. 4) of transforming the respective text feature vector for each of the four respective items for the each of the training quadruplets into a respective transformed representation using a feature representation transformation model having shared trainable parameters across the four respective items.

In some embodiments, quadruplet system 310 also can include a training system 515. In many embodiments, training system 515 can at least partially perform block 410 (FIG.

4) of generating a training dataset comprising training quadruplets, block 440 (FIG. 4) of training the shared trainable parameters of the feature representation transformation model, for the each of the training quadruplets, using a quadruplet loss for the four respective items of the each of the training quadruplets, to differentiate between the respective transformed representations of the four respective items, and/or block 605 (FIG. 6, described below) of generating a quadruplet loss.

In several embodiments, web server 320 can include a webpage system 522. Webpage system 521 can at least partially perform block 470 (FIG. 4) of sending instructions to display on the user device the one or more of (a) the one or more similar items or (b) the one or more complementary items, and/or sending instructions to user computers (e.g., 350-351 (FIG. 3)) based on information received from communication system 511.

Figure 6:
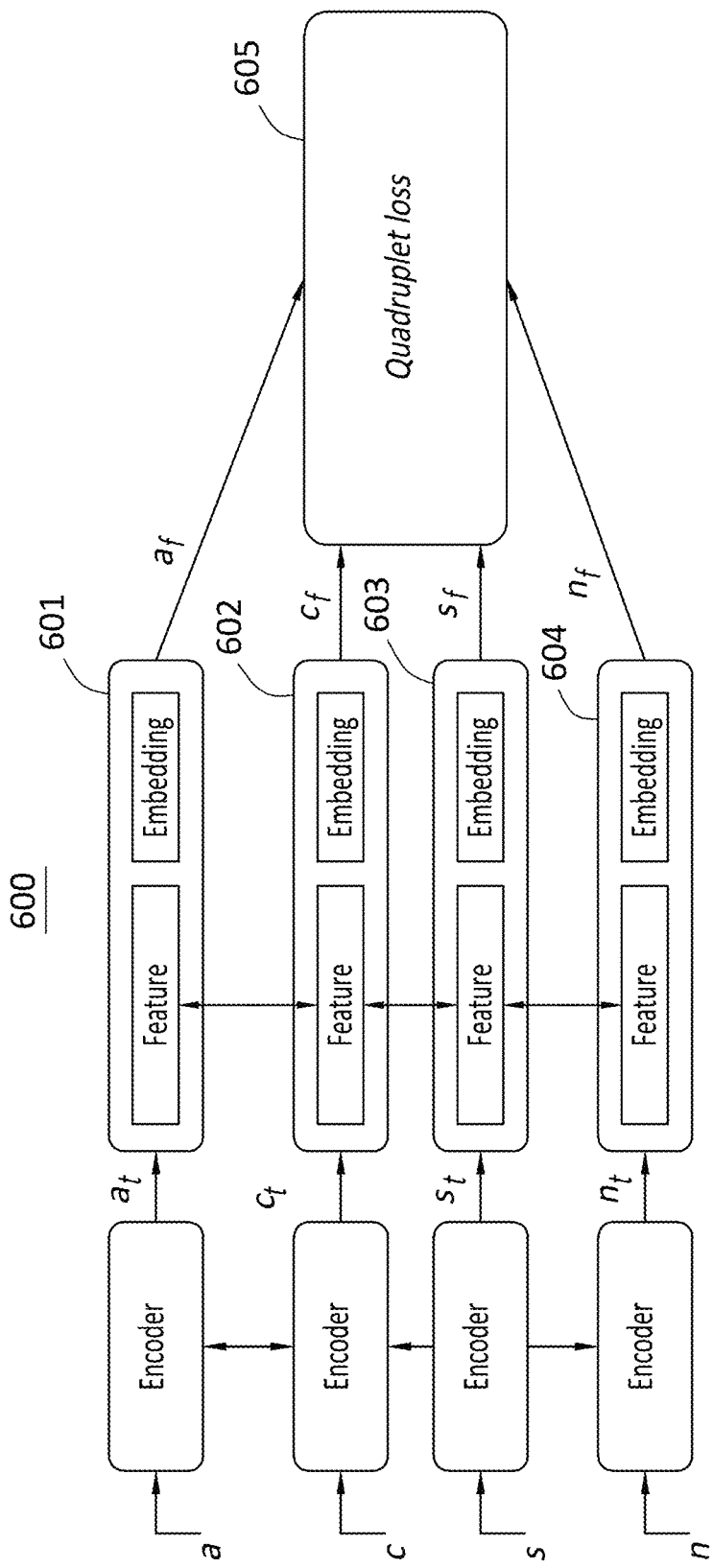
FIG. 6 illustrates a flow chart of a method, according to another embodiment.

Turning ahead in the drawings, FIG. 6 illustrates a flow chart of method 600, according to another embodiment. Method 600 can be similar to method 400 (FIG. 4), and various procedures, processes, and/or activities of method 600 can be similar or identical to various procedures, processes, and/or activities of method 400 (FIG. 4). Method 600 can be employed in many different embodiments and/or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped. In several embodiments, system 300 (FIG. 3) can be suitable to perform method 600 and/or one or more of the activities of method 600.

In these or other embodiments, one or more of the activities of method 600 can be implemented as one or more computing instructions configured to run at one or more processors and configured to be stored at one or more non-transitory computer-readable media. Such non-transitory computer-readable media can be part of a computer system such as quadruplet system 310 and/or web server 320. The processor(s) can be similar or identical to the processor(s) described above with respect to computer system 100 (FIG. 1).

In many embodiments, method 600 can include a block 601 of generating a feature representation $a_f$ for an anchor item a. In various embodiments, the feature representation of the anchor item, $a_f$, can be trained using a quadruplet loss. In a number of embodiments, generating $a_f$, can be based on a network architecture of an encoder (e.g., GUSE), using a title of the anchor item, to generate text feature vector $a_t$, which can be fed into a first fully connected layer, where the first fully connected layer output put can be fed into second fully connected layer, the output of which can be embedded into $a_f$, then trained using the quadruplet loss.

In several embodiments, method 600 can include a block 602 of generating a feature representation $c_f$ of a complementary item c In various embodiments, the feature representation of the complementary item, $c_f$, can be trained using a quadruplet loss. In a number of embodiments, generating $c_f$, can be based on the network architecture of an encoder (e.g., GUSE) using a title of the complementary item, to generate text feature vector $c_t$, which can be fed into fully connected layers, where the output of the fully connected layers can be embedded into $c_f$, then trained using the quadruplet loss.

In various embodiments, method 600 can include a block 603 of generating a feature representation $s_f$ of a similar item s. In various embodiments, the feature representation of the similar item, $s_f$, can be trained using a quadruplet loss. In a number of embodiments, generating $s_f$, can be based on the network architecture of an encoder (e.g., GUSE), using a title of the similar item, to generate text feature vector $s_t$, which can be fed into fully connected layers, where the output of the fully connected layers can be embedded into $s_f$, then trained using the quadruplet loss.

In many embodiments, method 600 can include a block 604 of generating a feature representation $n_f$ of a negative item n. In various embodiments, the feature representation of the negative item, $n_f$, can be trained using a quadruplet loss. In a number of embodiments, generating $n_f$, can be based on the network architecture of an encoder (e.g., GUSE), using a title of the negative item, to generate text feature vector $n_t$, which can be fed into fully connected layers, where the output of the fully connected layers can be embedded into $n_f$, then trained using the quadruplet loss.

In a number of embodiments, the encoder (e.g., GUSE) can use shared non-trainable parameters across each of the four instances. In many embodiments, the fully connected layers can use shared training parameters across each of the four instances.

In some embodiments, method 600 can include a block 605 of generating a quadruplet loss to train the shared trainable parameters. In many embodiments, the feature representations for the anchor item, the complementary item, the similarity item, and the negative item can be used in generating a quadruplet loss, which can be used to train the quadruplet network model.

Turning ahead in the drawings, FIG. 7 illustrates an exemplary graph 700 of a representation space, according to another embodiment. In some embodiments, the representation space can be a latent space. As shown in FIG. 7, a feature vector 701 of an anchor item, $a_f$, can be placed at the center of graph 700. The anchor item can be a red top (e.g., shirt), for example. There can be margins (e.g., circles) centered around feature vector 701 for the anchor item, such as a similarity margin $m_s$, with a radius 705; a complementary margin $m_c$, with a radius 706; and a negative margin $m_s$, with a radius 707. A feature vector 702 of a similar item, $s_f$, can fall within similarity margin $m_s$. For example, the similar item can be a blue top (e.g., shirt). A feature vector 703 of an complementary item, $c_f$, can fall within complementary margin $m_c$ but outside similarity margin $m_s$. For example, the complementary item jeans. A feature vector 704 of a negative item, $n_f$, can fall within negative margin $m_n$, but outside complementary margin $m_c$. For example, the negative item can be a dress.

In some embodiments, the text feature vectors $\{a_t, c_t, s_t, n_t\}$ can be generated from title information using the vector encoder. In several embodiments, a mapping function $f$ as learned, can project these text feature vectors into representations, which can model functional complementariness and similarity between items. In various embodiments, learning representations in a latent space can differentiate between similar, complementary, and negative items.

For example, referring to FIG. 7, feature vector 701 for the red top and feature vector 702 for the blue can be close together, with a distance less than radius 705, as both items can be functionally similar. As a further example, feature vector 703 for the jeans can be further away from feature vector 701, as the jeans can complement the red top. In many embodiments, feature vector 704 for the dress can be not functionally similar or complementary to the red top, so it can be placed far away from the red top. In some embodiments, the feature representations can be learned through the mapping functions, as trained by the quadruplet loss, and output as $\{a_f, c_f, s_f, n_f\}$. Table 1 below shows a chart of notations and descriptions describing the notations used herein.

TABLE 1

Variable Notations

| Notation | Description |
|---|---|
| a | Anchor item |
| c | Complementary item to anchor item |
| s | Similar item to anchor item |
| n | Negative item to anchor item |
| $a_t, c_t, s_t, n_t$ | Text feature vectors for a, c, s, n, t refers to a text feature |
| $a_f, c_f, s_f, n_f$ | Learnt feature representation for a, c, s, n |
| $a'_f, c'_f, s'_f, n'_f$ | Normalized learnt feature representation for a, c, s, n f refers to a mapping function |
| $L_{comp}$ | Loss between anchor item and complementary item, comp stands for complementary item |
| $L_{sim}$ | Loss between anchor item and similar item, sim stands for similar item |
| $L_{neg}$ | Loss between anchor item and negative item, neg stands for negative item |
| $m_s$ | Similarity margin, s stands for similarity |
| $\lambda$ | Regularization co-efficient |
| $L_{l2}$ | Regularization loss |
| $m_n$ | Negative margin, n stands for negative |
| $m_c$ | Complementary margin, c stands for complementary |
| d | Euclidean distance |
| y | Label variable |
| $L_{quad}$ | Quadruplet loss |

Figure 8:
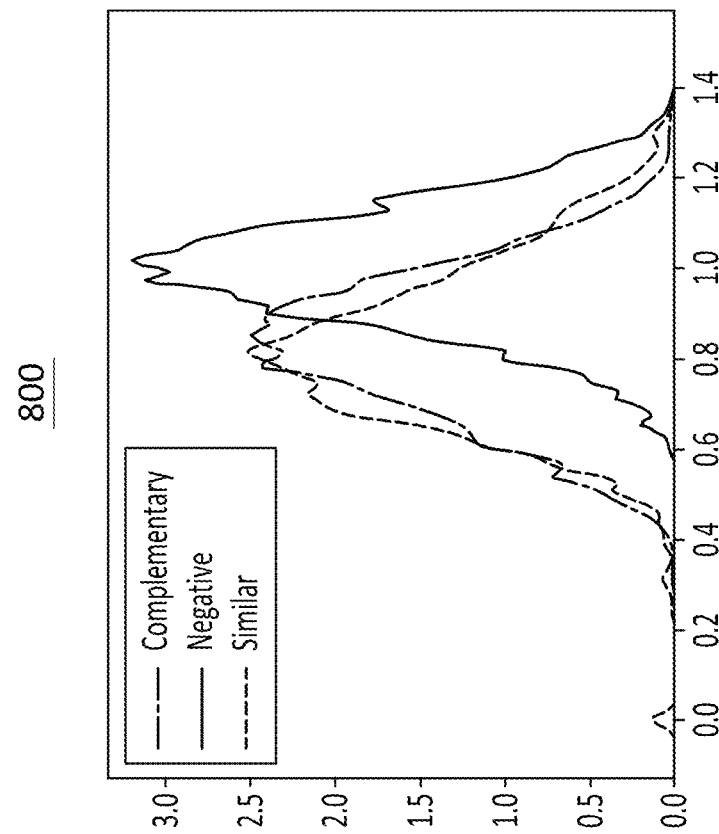
FIG. 8 illustrates an exemplary graph showing Euclidian distance distributions for similar, complementary, and negative items before training a quadruplet model.

Turning ahead in the drawings, FIG. 8 illustrates an exemplary graph 800 showing Euclidian distance distributions for similar, complementary, and negative items before training a quadruplet model. Graph 800 shows experimental data used in testing distance distribution of complementary items, similar items, and negative items before training quadruplets used in the complementary-similarity learning framework. The x-axis represents numbered Euclidean distances and the y-axis represents a probability density function.

FIG. 8 shows the probability density function (pdf) for (a) Euclidean distance between anchor items and similar items, (b) Euclidean distance between anchor items and complementary items, and (c) Euclidean distance between anchor items and negative items for embeddings before training. In some embodiments, both similar and complementary items can have similar distances, hence it can be difficult to differentiate between two.

Figure 9:
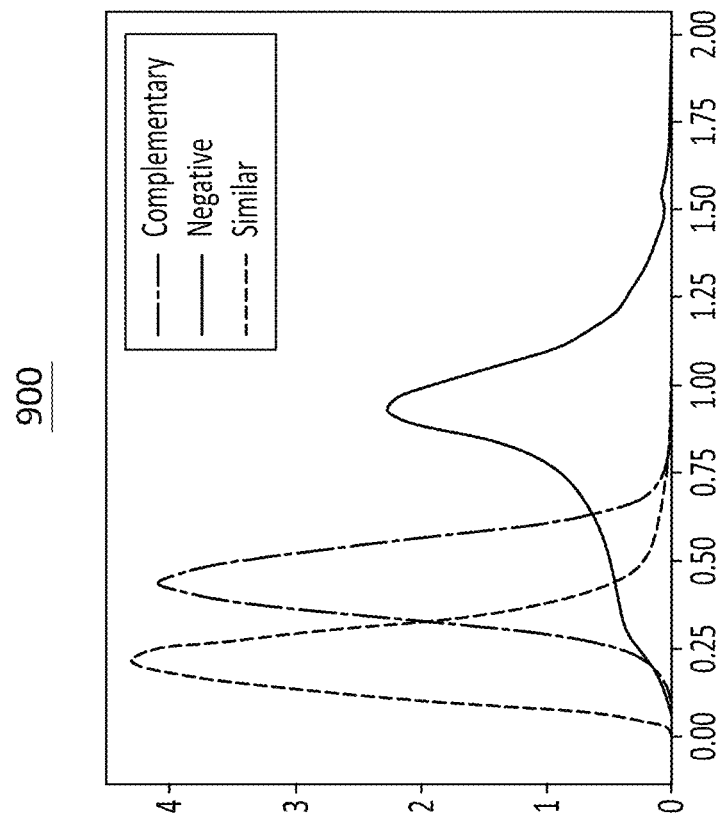
FIG. 9 illustrates an exemplary graph showing Euclidian distance distributions for similar, complementary, and negative items before training the quadruplet model.

Proceeding to the next drawing, FIG. 9 illustrates an exemplary graph 900 showing Euclidian distance distributions for similar, complementary, and negative items after training the quadruplet model. Graph 900 shows experimental data used in testing distance distribution of complementary items, similar items, and negative items after training quadruplets used in the complementary-similarity learning framework. The x-axis represents numbered Euclidean distances and the y-axis represents a probability density function.

FIG. 9 shows that the distribution of the items changes after training the quadruplet network, such that the similar and complementary distances are separated. The distance distribution between anchor and negative items can have more variance. One of the reasons can be that negative items can be randomly sampled, which can mean negative items can also contain some similar and complementary items.

In various embodiments, with the growing numbers of online purchases and increases in the variety of items available in e-commerce item catalogs, e-commerce companies can offer item recommendations on websites and online channels. In many embodiments, item recommendations can include similar and/or complementary items for the items recommended. In some embodiments, whether online or offline, a user can be interested in first exploring options for tops, before deciding upon which top to purchase from among similar items. In several embodiments, once the customer has purchased the top, additional item suggestions can be for jeans or jackets, which can be complementary items. In many embodiments, complementary item recommendations can serve a variety of purposes, such as reminding customers about other relevant complementary items to purchase, enabling catalog item discovery, and encouraging additional purchases and basket expansion.

It can be beneficial to identify a complementary pair of items, as functionally complementary items can be purchased together by users. Conventional approaches can use historical co-purchase data can be used to learn such item-complementary relations, however, there can be some challenges. For example, co-purchase data can usually be available for only a small percentage of items in an item catalog, as described by the Pareto principle. Conventional modeling approaches can primarily rely upon customer interaction data (e.g., co-views, co-purchases), such as collaborative filtering, without handling cold-start or low-engagement items. A quadruplet network can provide a technological improvement over conventional techniques of selecting complementary and/or similar items of an anchor item.

In various embodiments, the quadruplet network can learn complementary and similarity relations. Some embodiments can utilize item title text, which can be widely available item attribute on e-commerce websites for the task. In several embodiments, qualitative and quantitative results can show that learning complementary and similarity relations together can enable better learning of functional complementary relations. In many embodiments, this approach can enable searching for similar items and complementary items for a given anchor item. Additionally, a quadruplet network approach can address a cold start problem for items that do not have a substantial amount of data, such as an item added to a catalog, that a user has not ordered prior to receiving a recommendation. For example, a catalog can include approximately one hundred million items at any given period of time.

In many embodiments, the techniques described herein can provide several technological improvements. In some embodiments, the techniques described herein can provide for automatically differentiating between similar, complementary, and negative items, which can beneficially result in a reduction in processor use and memory cache.

In a number of embodiments, the techniques described herein can advantageously provide a consistent user experience by determining a complementary and/or a similar item for an anchor item to offer as item recommendations to a user. In various embodiments, with the growing numbers of online purchases and increases in the variety of items available in e-commerce item catalogs, e-commerce companies can offer item recommendations on websites and online channels. In many embodiments, item recommendations can have suggestions of complementary items for the items recommended. In some embodiments, whether online or offline, a customer can be interested in first exploring options for tops, before deciding upon which top to purchase. In several embodiments, once the customer has purchased the top, additional item suggestions can be for jeans or jackets. In many embodiments, complementary item recommendations can serve a variety of purposes, such as reminding customers about other relevant complementary items to purchase, enabling catalog item discovery, and encouraging additional purchases and basket expansion.

In many embodiments, the techniques described herein can be used continuously at a scale that cannot be handled using manual techniques. For example, the number of daily and/or monthly visits to the content source can exceed approximately ten million and/or other suitable numbers, the number of registered users to the content source can exceed approximately one million and/or other suitable numbers, and/or the number of items sold on the website can exceed approximately ten million (10,000,000) approximately each day. In some embodiments, the complementary-similarity learning framework can be applied across a broad set of items in an online catalog (e.g., item catalog) and can generate complementary item recommendations at scale.

In a number of embodiments, the techniques described herein can solve a technical problem that arises only within the realm of computer networks, as differentiating between similar, complementary, and negative items for an anchor item selected by a user in an online website does not exist outside the realm of computer networks. Moreover, the techniques described herein can solve a technical problem that cannot be solved outside the context of computer networks. Specifically, the techniques described herein cannot be used outside the context of computer networks, the machine learning techniques used, and because a content catalog, such as an online catalog, that can power and/or feed an online website that is part of the techniques described herein would not exist.

Various embodiments can include a system. The system can include one or more processors and one or more non-transitory computer-readable media storing computing instructions configured to run on the one or more processors and perform certain acts. The acts can include generating a training dataset comprising training quadruplets. Each of the training quadruplets can include four respective items of an item catalog. The four respective items can include (a) a respective anchor item, (b) a respective similar item, (c) a respective complementary item, and (d) a respective negative item. The acts also can include generating a respective text feature vector for each of the four respective items for the each of the training quadruplets using a vector encoder with shared non-trainable parameters across the four respective items. The acts further can include transforming the respective text feature vector for each of the four respective items for the each of the training quadruplets into a respective transformed representation. Transforming the respective text feature can include using a feature representation transformation model having shared trainable parameters across the four respective items. The acts additionally can include training the shared trainable parameters of the feature representation transformation model. Each of the training quadruplets can include using a quadruplet loss for the four respective items of the each of the training quadruplets to differentiate between the respective transformed representations for the four respective items. The acts also can include receiving, from a user device a selection of an anchor item from the item catalog. The acts further can include determining, for the anchor item, one or more of (a) one or more similar items from the item catalog or (b) one or more complementary items from the item catalog, using the feature representation transformation model, as trained. The acts additionally can include sending instructions to display the one or more of the one or more similar items. The acts also can include sending instructions to display on the user device the one or more of the one or more complementary items on the user device.

Several embodiments can include a method. The method can be implemented via execution of computing instructions configured to run at one or more processors and stored at one or more non-transitory computer-readable media. The method can include generating a training dataset comprising training quadruplets. Each of the training quadruplets comprises four respective items of an item catalog. The four respective items can include (a) a respective anchor item, (b) a respective similar item, (c) a respective complementary item, and (d) a respective negative item. The method also can include generating a respective text feature vector for each of the four respective items for the each of the training quadruplets using a vector encoder with shared non-trainable parameters across the four respective items. The method additionally can include transforming the respective text feature vector for each of the four respective items for the each of the training quadruplets into a respective transformed representation using a feature representation transformation model having shared trainable parameters across the four respective items. The method can also include training the shared trainable parameters of the feature representation transformation model. Each of the training quadruplets can include using a quadruplet loss for the four respective items of the each of the training quadruplets to differentiate between the respective transformed representations for the four respective items. The method also can include receiving, from a user device, a selection of an anchor item from the item catalog. The method additionally can include determining, for the anchor item, one or more of (a) one or more similar items from the item catalog or (b) one or more complementary items from the item catalog, using the feature representation transformation model, as trained. The method further can include sending instructions to display the one or more of the one or more similar items. The method further can include sending instructions to display on the user device the one or more of the one or more complementary items on the user device.

Although complementary-similarity learning using a quadruplet network has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the procedures, processes, or activities of FIGS. 4 and 6 may include different procedures, processes, and/or activities and be performed by many different modules, in many different orders, and/or one or more of the procedures, processes, or activities of FIGS. 4 and 6 may include one or more of the procedures, processes, or activities of another different one of FIGS. 4 and 6. As another example, the systems within quadruplet system 310 and/or webserver 320 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed:

1. A system comprising:
one or more processors; and
one or more non-transitory computer-readable media storing computing instructions configured to run on the one or more processors and perform:
generating a training dataset comprising training quadruplets, wherein each of the training quadruplets comprises four respective items of an item catalog, the four respective items comprising (a) a respective anchor item, (b) a respective similar item, (c) a respective complementary item, and (d) a respective negative item;
generating a respective text feature vector for each of the four respective items for the each of the training quadruplets using a vector encoder with shared non-trainable parameters across the four respective items;
transforming the respective text feature vector for each of the four respective items for the each of the training quadruplets into a respective transformed representation using a feature representation transformation model having shared trainable parameters across the four respective items;
training the shared trainable parameters of the feature representation transformation model, for the each of the training quadruplets, using a quadruplet loss for the four respective items of the each of the training quadruplets, to differentiate between the respective transformed representations for the four respective items;
receiving, from a user device, a selection of an anchor item from the item catalog;
determining, for the anchor item, one or more of (a) one or more similar items from the item catalog or (b) one or more complementary items from the item catalog, using the feature representation transformation model, as trained; and
sending instructions to display on the user device the one or more of (a) the one or more similar items or (b) the one or more complementary items.

2. The system of claim 1, wherein the transforming the respective text feature vector using a feature representation transformation model further comprises:
using a neural network comprising a first fully connected layer with a Rectified Linear Unit (ReLU) and a second fully connected layer.

3. The system of claim 2, wherein:
a dimension of a vector embedding output of the first fully connected layer with the ReLU is 256; and
a dimension of the respective transformed representation for each of the four respective items for the each of the training quadruplets generated by the second fully connected layer is 128.

4. The system of claim 1, wherein:
a dimension of the respective text feature vector generated by the vector encoder is 512; and
the vector encoder is a Google Universal Sentence Encoder ("GUSE").

5. The system of claim 1, wherein training the shared trainable parameters of the feature representation transformation model further comprises:
determining the quadruplet loss, for each of the training quadruplets, based on a quadruplet loss function comprising a similarity loss function, a complementary loss function, and a negative loss function.

6. The system of claim 5, wherein determining the quadruplet loss further comprises:
generating the similarity loss function using a similarity margin.

7. The system of claim 6, wherein determining the quadruplet loss further comprises:
generating the complementary loss function using the similarity margin and a complementary margin.

8. The system of claim 5, wherein determining the quadruplet loss further comprises:
generating the negative loss function using a negative margin.

9. The system of claim 1, wherein the one or more similar items to the anchor item are determined based on respective second transformed representations generated using the feature representation model, as trained, for each of the one or more similar items in the item catalog being within a similarity margin.

10. The system of claim 1, wherein the one or more complementary items to the anchor item are determined based on respective second transformed representations generated using the feature representation model, as trained, for each of the one or more complementary items in the item catalog being outside a similarity margin and inside a complementary margin.

11. A method being implemented via execution of computing instructions configured to run at one or more processors and stored at one or more non-transitory computer-readable media, the method comprising:
generating a training dataset comprising training quadruplets, wherein each of the training quadruplets comprises four respective items of an item catalog, the four respective items comprising (a) a respective anchor item, (b) a respective similar item, (c) a respective complementary item, and (d) a respective negative item;
generating a respective text feature vector for each of the four respective items for the each of the training quadruplets using a vector encoder with shared non-trainable parameters across the four respective items;
transforming the respective text feature vector for each of the four respective items for the each of the training quadruplets into a respective transformed representation using a feature representation transformation model having shared trainable parameters across the four respective items;
training the shared trainable parameters of the feature representation transformation model, for the each of the training quadruplets, using a quadruplet loss for the four respective items of the each of the training quadruplets, to differentiate between the respective transformed representations for the four respective items;

receiving, from a user device, a selection of an anchor item from the item catalog;

determining, for the anchor item, one or more of (a) one or more similar items from the item catalog or (b) one or more complementary items from the item catalog, using the feature representation transformation model, as trained; and sending instructions to display on the user device the one or more of (a) the one or more similar items or (b) the one or more complementary items.

12. The method of claim 11, wherein the transforming the respective text feature vector using a feature representation transformation model further comprises:

using a neural network comprising a first fully connected layer with a Rectified Linear Unit (ReLU) and a second fully connected layer.

13. The method of claim 12, wherein:

a dimension of a vector embedding output of the first fully connected layer with the ReLU is 256; and a dimension of the respective transformed representation for each of the four respective items for the each of the training quadruplets generated by the second fully connected layer is 128.

14. The method of claim 11, wherein:

a dimension of the respective text feature vector generated by the vector encoder is 512; and the vector encoder is a Google Universal Sentence Encoder ("GUSE").

15. The method of claim 11, wherein training the shared trainable parameters of the feature representation transformation model further comprises:

determining the quadruplet loss, for each of the training quadruplets, based on a quadruplet loss function comprising a similarity loss function, a complementary loss function, and a negative loss function.

16. The method of claim 15, wherein determining the quadruplet loss further comprises:

generating the similarity loss function using a similarity margin.

17. The method of claim 16, wherein determining the quadruplet loss further comprises:

generating the complementary loss function using the similarity margin and a complementary margin.

18. The method of claim 15, wherein determining the quadruplet loss further comprises:

generating the negative loss function using a negative margin.

19. The method of claim 11, wherein the one or more similar items to the anchor item are determined based on respective second transformed representations generated using the feature representation model, as trained, for each of the one or more similar items in the item catalog being within a similarity margin.

20. The method of claim 11, wherein the one or more complementary items to the anchor item are determined based on respective second transformed representations generated using the feature representation model, as trained, for each of the one or more complementary items in the item catalog being outside a similarity margin and inside a complementary margin.

* * * * *